United States Patent
Salter et al.

(10) Patent No.: US 9,994,089 B1
(45) Date of Patent: Jun. 12, 2018

(54) VEHICLE CURTAIN

(71) Applicant: Ford Global Technologies, LLC, Dearborn, MI (US)

(72) Inventors: Stuart C. Salter, White Lake, MI (US); Annette Lynn Huebner, White Lake, MI (US); Kristin Ann Hellman, Walled Lake, MI (US); Ryan Welch, Ottawa Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/362,984

(22) Filed: Nov. 29, 2016

(51) Int. Cl.
| *B62D 25/10* | (2006.01) |
| *B60J 1/20* | (2006.01) |
| *B60J 5/10* | (2006.01) |
| *B60Q 1/00* | (2006.01) |

(52) U.S. Cl.
CPC ........... *B60J 1/2011* (2013.01); *B60J 1/2038* (2013.01); *B60J 1/2041* (2013.01); *B60J 1/2052* (2013.01); *B60J 1/2063* (2013.01); *B60J 1/2072* (2013.01); *B60J 5/101* (2013.01); *B60Q 1/0035* (2013.01); *B60Q 2500/10* (2013.01)

(58) Field of Classification Search
CPC ...... B60J 1/2011; B60J 1/2038; B60J 1/2041; B60J 1/2052; B60J 1/2063; B60J 1/2072; B60J 5/101; B60Q 1/0035; B60Q 2500/10
See application file for complete search history.

(56) References Cited

U.S. PATENT DOCUMENTS

| 2,486,859 | A | | 11/1949 | Meijer et al. |
| 4,139,231 | A | | 2/1979 | Lang et al. |
| 4,519,409 | A | * | 5/1985 | Kinney ................... E04H 15/06 |
| | | | | 135/88.08 |
| 4,544,195 | A | * | 10/1985 | Gunn ..................... B60P 3/341 |
| | | | | 135/88.09 |
| 5,053,930 | A | | 10/1991 | Benavides |
| 5,358,298 | A | | 10/1994 | Fate |
| 5,434,013 | A | | 7/1995 | Fernandez |
| 5,582,456 | A | | 12/1996 | Hammond |
| 5,709,453 | A | | 1/1998 | Krent et al. |
| 5,813,449 | A | | 9/1998 | Patmore et al. |
| 5,820,189 | A | | 10/1998 | Tew |
| 5,839,718 | A | | 11/1998 | Hase et al. |
| 5,857,725 | A | | 1/1999 | Croke et al. |
| 6,031,511 | A | | 2/2000 | DeLuca et al. |
| 6,117,362 | A | | 9/2000 | Yen et al. |
| 6,419,854 | B1 | | 7/2002 | Yocom et al. |
| 6,494,490 | B1 | | 12/2002 | Trantoul |
| 6,577,073 | B2 | | 6/2003 | Shimizu et al. |
| 6,729,738 | B2 | | 5/2004 | Fuwausa et al. |

(Continued)

FOREIGN PATENT DOCUMENTS

| CN | 101337492 A | 1/2009 |
| CN | 201169230 Y | 2/2009 |

(Continued)

*Primary Examiner* — Lori L Lyjak
(74) *Attorney, Agent, or Firm* — Vichit Chea; Price Heneveld LLP

(57) ABSTRACT

A vehicle includes a lift gate operable between the open and closed positions and includes an interior trim panel. A track assembly is positioned on a perimeter of the interior trim panel. A curtain is coupled to the track assembly and configured to hang from the lift gate in the open position.

20 Claims, 13 Drawing Sheets

(56) References Cited

U.S. PATENT DOCUMENTS

| | | |
|---|---|---|
| 6,737,964 B2 | 5/2004 | Samman et al. |
| 6,773,129 B2 | 8/2004 | Anderson, Jr. et al. |
| 6,811,207 B2 | 11/2004 | Dalpizzol et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,077,453 B1 * | 7/2006 | Walker .................. B60R 5/04 296/26.06 |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | La Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Kuday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 8,994,495 B2 | 3/2015 | Dassanayake et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,568,659 B2 | 2/2017 | Verger et al. |
| 9,616,812 B2 | 4/2017 | Sawayanagi |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2003/0230329 A1 * | 12/2003 | McGarty ................ E04H 15/06 135/88.07 |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0049652 A1 | 3/2006 | Martin |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0048658 A1 | 3/2011 | Nedelman et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2017/0100990 A1 * | 4/2017 | Kreutzer ................ B60J 1/2011 |
| 2017/0158125 A1 | 6/2017 | Schuett et al. |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

* cited by examiner

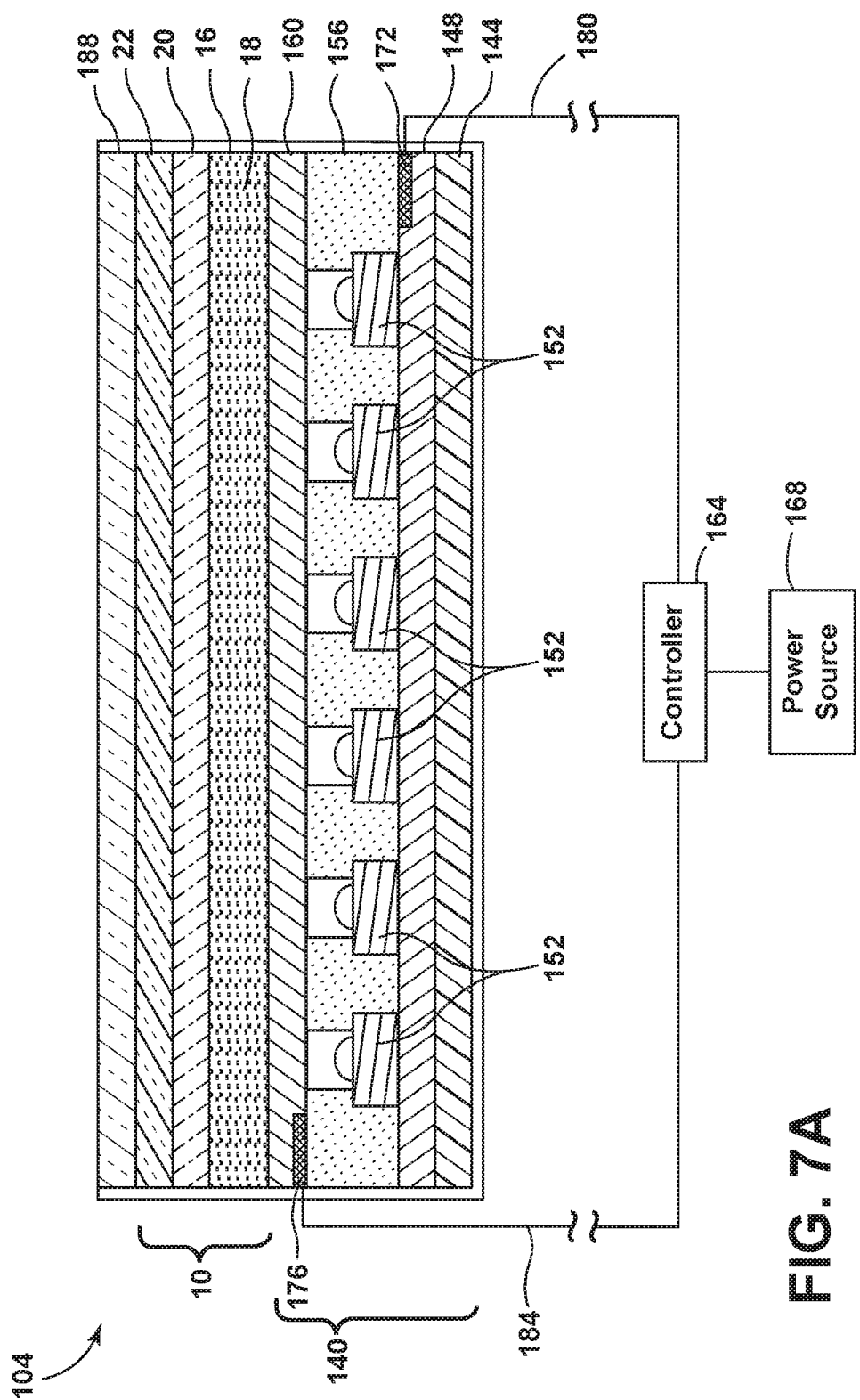

US 9,994,089 B1

VEHICLE CURTAIN

FIELD OF THE INVENTION

The present disclosure generally relates to vehicles curtains, and more particularly to relates to vehicle curtains coupled to vehicle lift gates.

BACKGROUND OF THE INVENTION

Vehicles including curtains may offer a variety of utility and privacy benefits. Accordingly, providing curtain in vehicles may be advantageous.

SUMMARY OF THE INVENTION

According to one aspect of the present disclosure, a vehicle includes a lift gate operable between the open and closed positions and includes an interior trim panel. A track assembly is positioned on a perimeter of the interior trim panel. A curtain is coupled to the track assembly and configured to hang from the lift gate in the open position.

According to another aspect of the present disclosure, a vehicle includes a lift gate operable between the open and closed positions. A track assembly is positioned proximate a perimeter of the lift gate. A curtain is coupled to the track assembly and configured to hang from the lift gate in the open position. The curtain defines occupancy space behind a vehicle and under the lift gate in an open position.

According to yet another aspect of the present disclosure, a vehicle includes a lift gate operable between the open and closed positions. A track assembly is positioned proximate a perimeter of the lift gate. A curtain is coupled to the track assembly and configured to hang from the lift gate in the open position. The curtain comprises a photoluminescent structure.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIG. 7A is an enhanced view taken at section VIIA of FIG. 3 illustrating a light source according to one example;

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 1A:
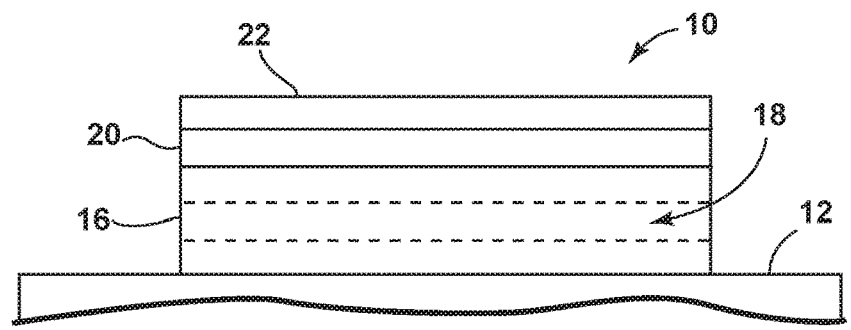
FIG. 1A is a side view of a photoluminescent structure rendered as a coating for use in a trim assembly, according to one embodiment.
Figure 1B:
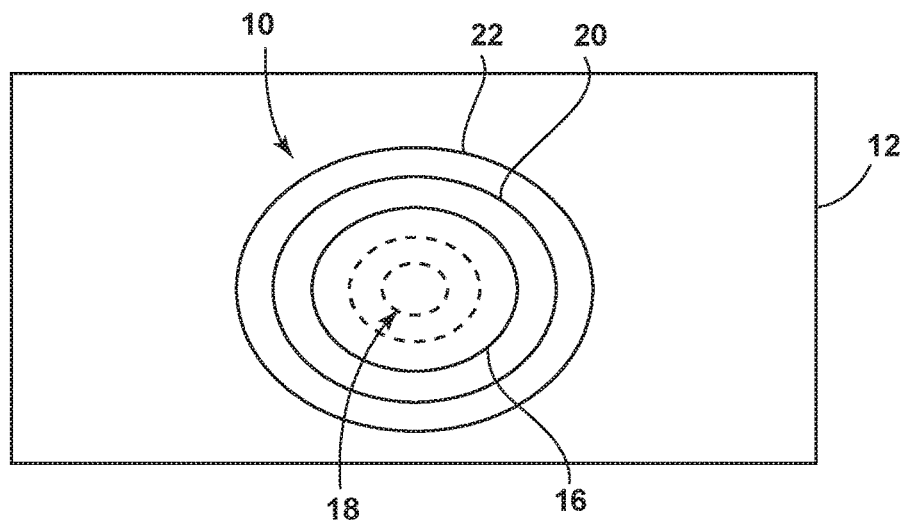
FIG. 1B is a top view of a photoluminescent structure rendered as a discrete particle, according to one embodiment.
Figure 1C:
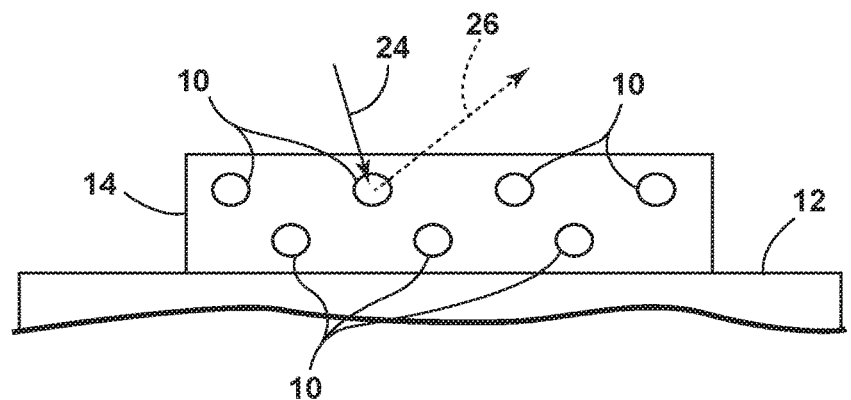
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or a light source 104 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m². A visibility of 0.32 mcd/m² is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source and/or ambient sources. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m² after a period of 10 minutes. Additionally, the long persistence photoluminescent material 18 may be operable to emit light above or at an intensity of 0.32 mcd/m² after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources that emits the excitation light 24, including, but not limited to, natural light sources (e.g., the sun) and/or any artificial light source. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m², or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue-emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in toluene/isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Referring now to FIGS. 2-6, reference numeral 40 generally indicates a vehicle. The vehicle 40 includes a lift gate 44 operable between both open (FIG. 2A) and closed (FIG. 4) positions. The lift gate 44 includes an interior trim panel 48 positioned on an interior side of the lift gate 44. A track assembly 52 is positioned proximate a perimeter of the interior trim panel 48. A curtain 56 is coupled to the track assembly 52 and configured to hang from the lift gate 44 when the lift 44 is in the open position. The curtain 56 defines an occupancy space 60 behind the vehicle 40 and under the lift gate 44 when the curtain 56 is hanging from the lift gate 44. According to various embodiments, the curtain 56 may include the photoluminescent structure 10.

Although the vehicle 40 is depicted as a sport utility vehicle (SUV), it will be understood that the vehicle 40 may alternatively be a van, a hatch-back sedan, a pick-up truck with a topper, or other vehicle capable of employing structures similar to the lift gate 44. As explained above, the lift gate 44 is operable between open and closed positions. In the open position, the lift gate 44 allows access to an interior 64 of the vehicle 40. Within the interior 64 of the vehicle 40 may be a cargo space 68. The cargo space 68 may be configured to hold a variety of objects and will be accessible from an exterior of the vehicle 40 when the lift gate 44 is in the opened position. When the lift gate 44 is in the closed position, the lift gate 44 closes off the interior 64 of the vehicle 40 from the exterior. Further, when the lift gate 44 is in the closed position, the interior trim panel 48 is positioned within the interior 64 and/or cargo space 68 of the vehicle 40. The track assembly 52 is positioned proximate a perimeter of the interior trim panel 48. The track assembly 52 may extend over a portion, or the entire perimeter of the interior trim panel 48. Further, the track assembly 52 may be composed of a plurality of smaller track portions positioned around the perimeter of the interior trim panel 48.

Figure 2A:
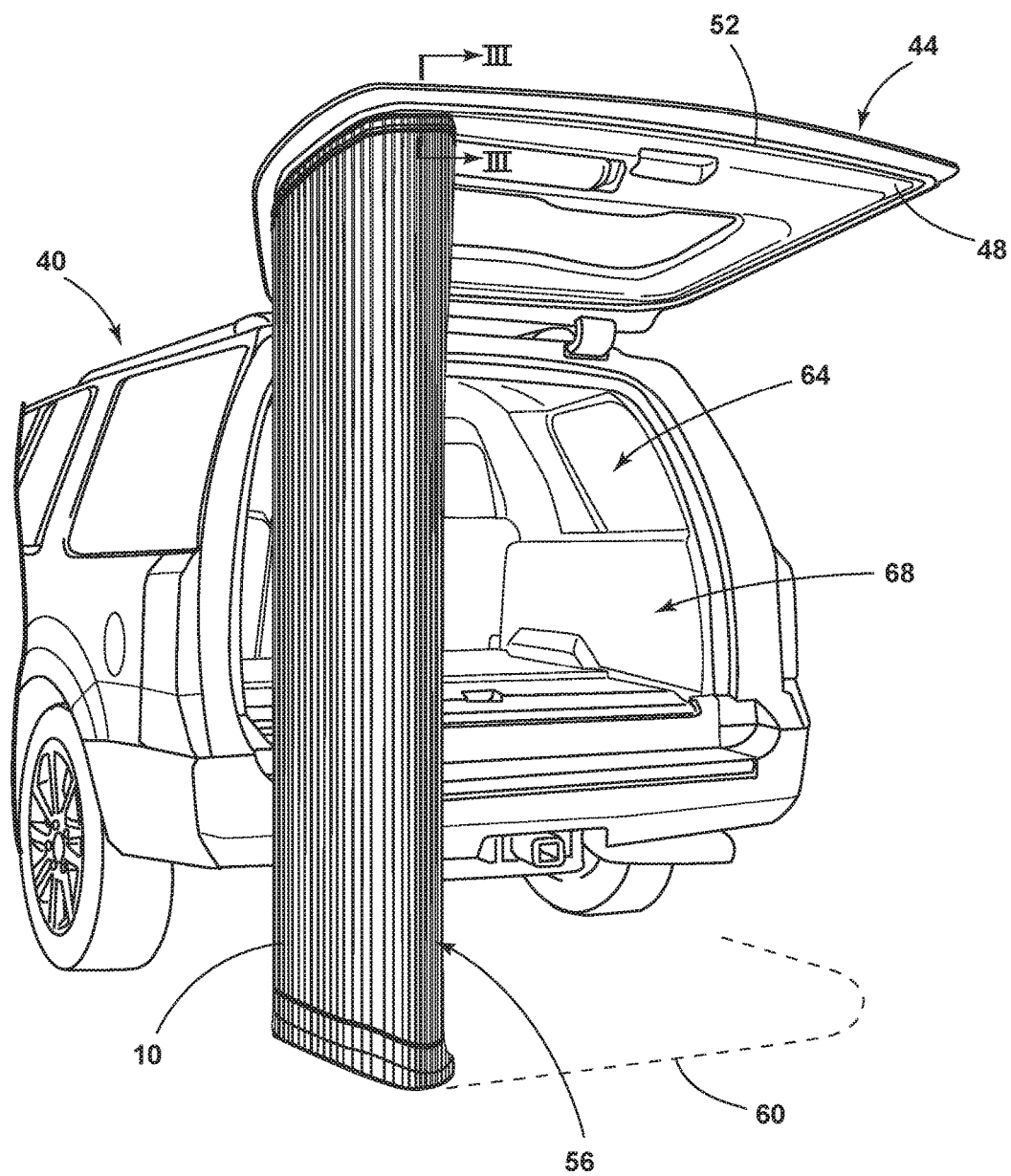
FIG. 2A is a rear perspective view of a vehicle with a curtain in an undeployed position, according to one example.
Figure 2B:
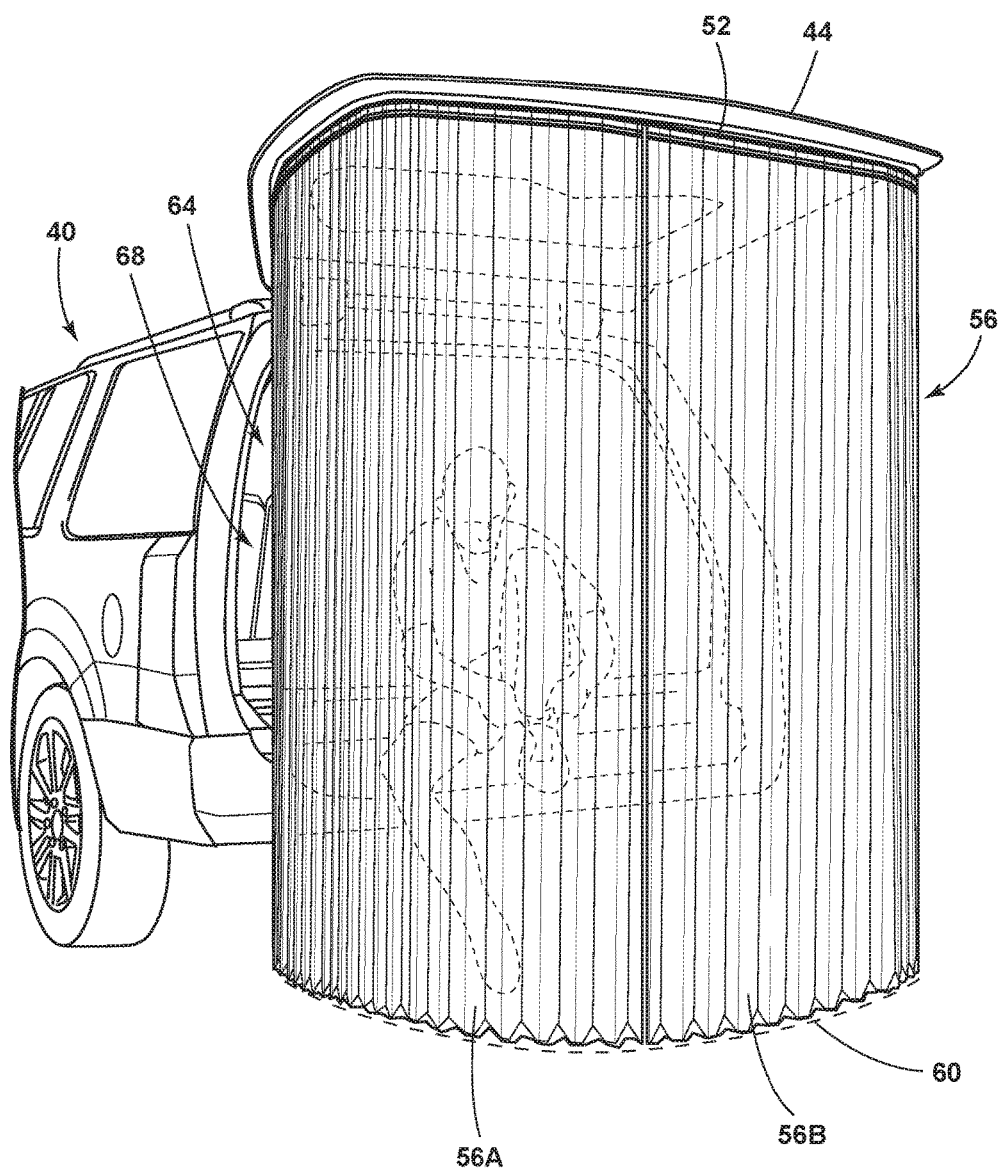
FIG. 2B is a rear perspective of the vehicle with the curtain in a deployed position, according to another example.

Referring now to FIGS. 2A and 2B, the curtain 56 is coupled to the track assembly 52 and is configured to hang from the lift gate 44 when the lift gate 44 is in the open position. The curtain 56 is operable between undeployed (FIG. 2A) and deployed (FIG. 2B) positions. The curtain 56 is slidable along the track assembly 52 between the undeployed and deployed positions. The curtain 56 may be a single or unitary structure which may extend over the length of the track assembly 52 or may be composed of a plurality of portions, each independently movable along the track assembly 52. In the depicted example, the curtain 56 includes a first portion 56A and second portion 56B. The first and second portions 56A, 56B may independently move along the track assembly 52 and cooperate to define the occupancy space 60. It will be understood that unitary examples of the curtain 56 may also define the occupancy space in a similar manner. The occupancy space 60 is defined rearward of the vehicle 40 and below the lift gate 44 in the opened position. The occupancy space 60 may be sized roughly to that of one or multiple people such that the curtain 56 may surround one or more individuals.

The curtain 56 may be transparent, substantially transparent, translucent, partially opaque, substantially opaque, or completely opaque. According to some examples, the transparency or opacity of the curtain 56 may vary across the body of the curtain 56. For example, the curtain 56 may define one or more transmissive zones, while in other locations the curtain 56 is substantially opaque. In such an example, the transmissive zones may allow a user of the curtain 56 to see into and/or out from the occupancy space 60. In translucent, partially opaque, substantially opaque or opaque examples of the curtain 56, use of the curtain 56 may be advantageous in providing privacy to the individuals within the occupancy space 60. For example, the curtain 56 may provide privacy to individuals standing within the occupancy space 60 who are changing clothes (i.e., between events, in case of spills, etc.) or in other events which may require privacy (e.g., online banking, reviewing personal or confidential information, etc.). Use of the curtain 56 which is slidably coupled to the track assembly 52 to define the occupancy space 60 may be advantageous in allowing quick deployment of the curtain 56 to provide privacy in the above-noted circumstances.

The curtain 56 may be composed of a polymeric material, a cloth material, a metallic material, or combinations thereof. According to some examples, the curtain 56 may have a woven structure or pattern of individual fibers (e.g., fibers of the polymeric, cloth or metallic materials). In other examples, the curtain 56 may be a single continuous sheet of material (e.g., a polymeric and/or metallic film). The curtain 56 may include dyes and/or pigments to alter a color of the material from which the curtain 56 is formed. According to various examples, the color of the first and second portions 56A, 56B of the curtain 56 may be different than one another. Further, the curtain 56 may include one or more indicia positioned on an exterior surface of the curtain 56 and/or an interior surface of the curtain 56. The indicia may be alpha-numeric text, symbols, pictures and/or combinations thereof. The indicia may be defined by different colors, transparency, opacity, reflectivity and/or other optical characteristics which are different from that of the rest of the curtain 56.

The curtain 56 may include the photoluminescent structure 10 as described above. The photoluminescent structure 10 may be formed as a continuous or discontinuous structure 10 over the interior and/or exterior surface of the curtain 56. In some examples, the photoluminescent structure 10 may form a pattern or the indicia across the curtain 56. In other examples, the curtain 56 may be ladened with the photoluminescent material 18 such that a portion or the entire curtain 56 may form the photoluminescent structure 10. In other words, the material of the curtain 56 may function as a host for the photoluminescent material 18. Use of the photoluminescent material 18 and/or the photoluminescent structure 10 on and/or in the curtain 56 may allow the curtain 56 to emit the converted light 26 both in a direction toward the interior 64 of the vehicle 40 and the occupancy space 60 as well as in an outward direction from beneath the lift gate 44. According to various examples, the curtain 56 may be water resistant and/or water proof. Water resistant and/or waterproof examples of the curtain 56 may allow users of the curtain 56 to avoid contact with environmental precipitation (e.g., snow, rain, sleet, etc.) when in the occupancy space 60. Further, the curtain 56 may reduce wind, or environmental exposure to users within the occupancy space 60. Further, as the occupancy space 60 is in fluid and environmental communication with the interior 64 of the vehicle 40, the curtain 56 may be configured to retain that environment within the occupancy space 60.

Figure 3:
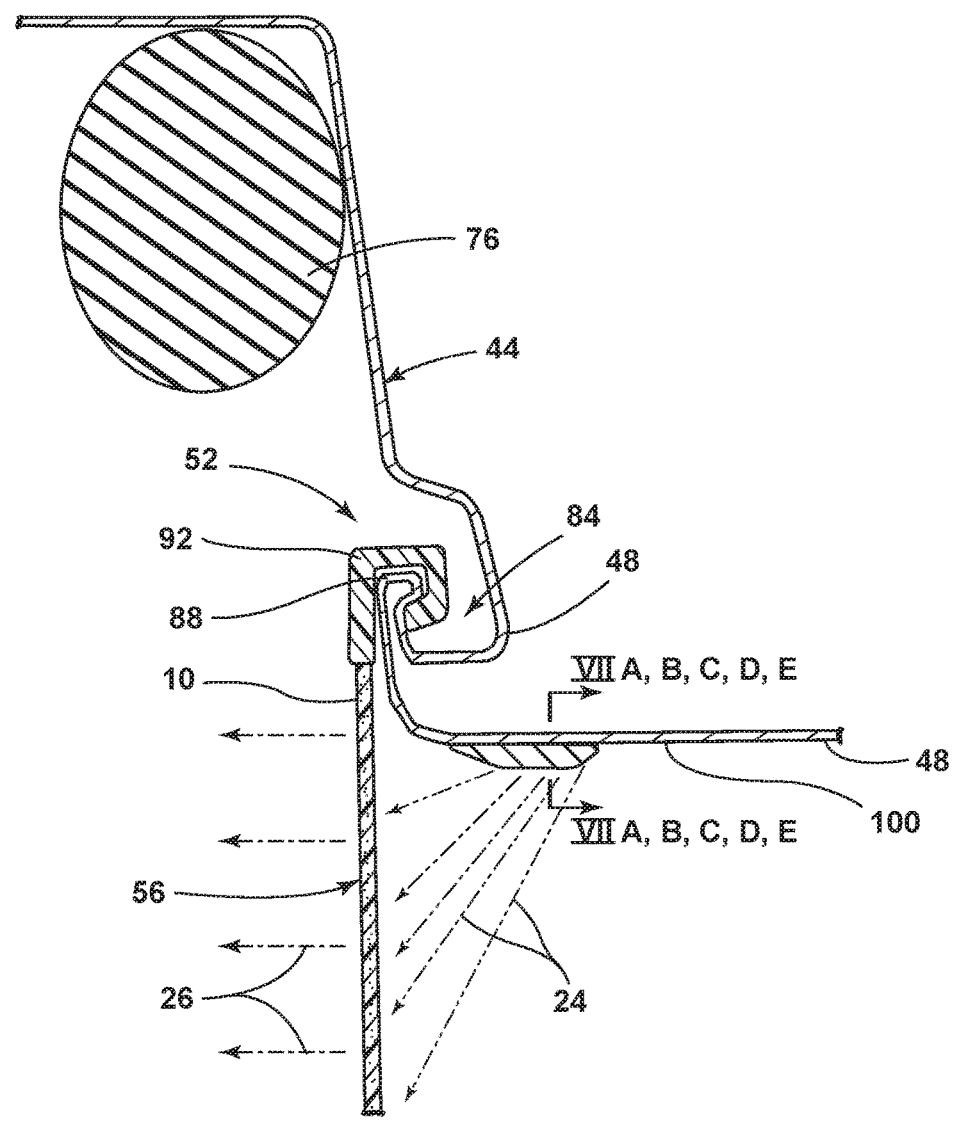
FIG. 3 is a cross-sectional view taken along line III of FIG. 2A, showing the coupling of the curtain on the lit gate according to one embodiment.

Referring now to FIG. 3, the lift gate 44 includes a rubber hatch seal 76 extending around a perimeter of the lift gate 44 to seal the lift gate 44 when it is in the closed position. As explained above, the track assembly 52 extends proximate a perimeter of the interior trim panel 48. In the depicted example, the track assembly 52 is defined by the interior trim panel 48. It will be understood that in alternative examples, the track assembly 52 may be a separate structure positioned on and coupled to the interior trim panel 48. The track assembly 52 includes a cavity 84 defined in the interior trim panel 48. The interior trim panel 48 and cavity 84 cooperate to define a support feature 88 upon which the curtain 56 is supported. In the depicted embodiment, the support feature 88 is generally hooked-shaped in nature and the cavity 84 has a substantially inverse shape as the support feature 88, but it will be understood that the cavity 84 and support feature 88 may take a variety of configurations. For example, the cavity 84 may be generally "T" shaped and the support features 88 may be the portions of the panel 48 which contact the body of the "T." The support feature 88 may be a single continuous structure which extends the length of the track assembly 52, or may be a plurality of structures intermittently spaced along the track assembly 52. In some examples, various support features 88 may have different lengths along the track assembly 52. Further, each of the support features 88 may have a different shape or configuration. Coupled to the support feature 88 is a curtain coupling feature 92. The coupling feature 92 is configured to allow the curtain 56 to slide along the support feature 88 and along the track assembly 52. The curtain 56 may include a single continuous coupling feature 92 disposed along a top of the curtain 56, or may include a plurality of curtain coupling features 92 disposed along the top of the curtain 56.

Figure 4:
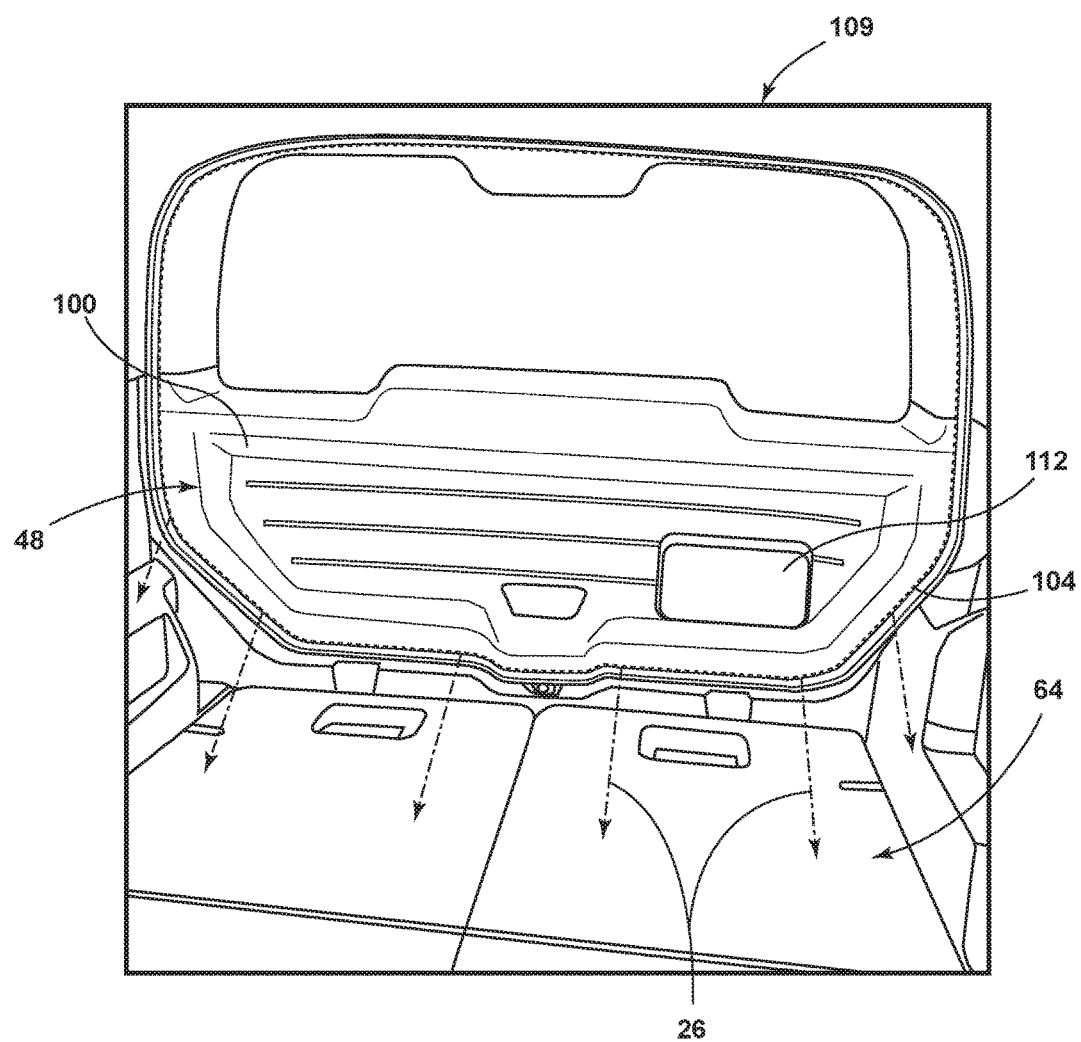
FIG. 4 is rear perspective view of a vehicle with the left gate closed, according to another example.

Referring now to FIGS. 3 and 4, positioned on cargo surface 100 of the interior trim panel 48 is a light source 104. The light source 104, in the depicted example extends substantially around the interior trim panel 48 proximate a perimeter. It will be understood that in other examples, the light source 104 may be a discontinuous structure or only be located at certain portions on the cargo surface 100. When the lift gate 44 is in the opened position (FIG. 3) the light source 104 may be configured to emit light toward and/or onto the curtain 56. Such light emitted from the light source 104 may be used to charge the photoluminescent material 18 or photoluminescent structure 10 of the curtain 56. In other words, the light emitted from the light source 104 may be the excitation light 24. Further, the light from the light source 104 may be configured to generally illuminate the curtain 56 or to provide lighting to the occupancy space 60. When the lift gate 44 is in the closed position (FIG. 4), the light source 104 is exposed and opened to the interior 64 and the cargo space 68 of the vehicle 40. While in the closed position, the light source 104 may emit light into the cargo space 68 and the interior 64 to function as sconce lighting or provide ambient lighting to the interior 64 of the vehicle 40. According to some examples, only a lower half of the light source 104 may be activated while the vehicle 40 is in motion such that the vision of a driver of the vehicle 40 is not obscured by light from the light source 104 (e.g., in night driving conditions). When the lift gate 44 is in the closed position, the track assembly 52 may be concealed. Positioned on the cargo surface 100 of the interior trim panel 48 is a storage bin 112. The storage bin 112 may be sized and configured to store the curtain 56 when not coupled to the track assembly 52. Further, according to some examples, the storage bin 112 may include a light to charge the curtain 56 while stored. In such examples, the storage bin 112 may also include a light sensor for monitoring a charge level of the curtain 56 and activate the light if the luminance of the curtain 56 falls below a predefined threshold. It will be understood that the curtain 56 may remain coupled to the track assembly 52 when the lift gate 44 is in the closed position. For example, the curtain 56 may be used to provide privacy by blocking a window located on the lift gate 44.

Figure 5:
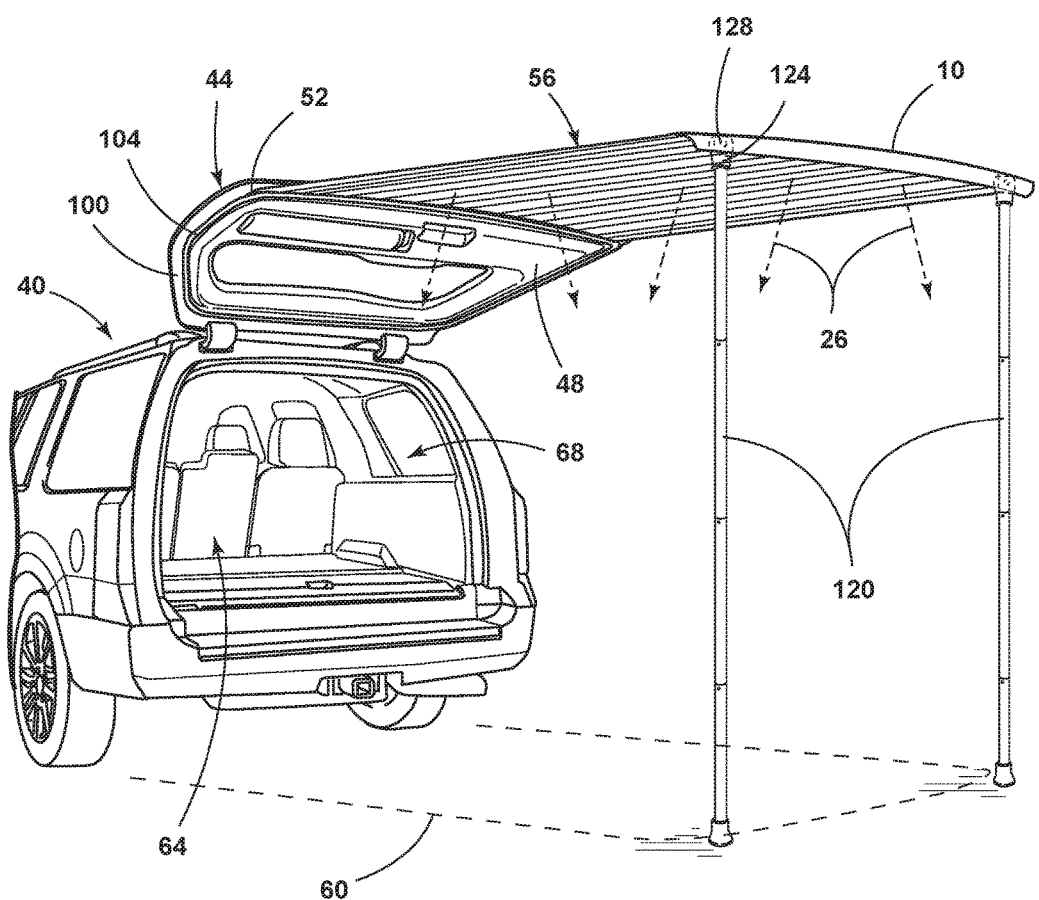
FIG. 5 is a perspective view of a vehicle lift gate in an open position, according to one example.

Referring now to FIG. 5, the curtain 56 may be configured to extend rearwardly from the lift gate 44 and be coupled to one or more support members 120. In such an example, the curtain 56 may function as a canopy to define a larger occupancy space 60 between a rear of the vehicle 40 and the support members 120. The support members 120 are depicted as a pair of extendable poles, but it will be understood that support members 120 may take a variety of configurations. Further, although depicted with two support members 120, the curtain 56 may be supported in the canopy configuration by a single support member 120 or greater than two support members 120. In such examples, the curtain 56 may include attachment features 124 which are configured to couple with retention features 128 of the support members 120. The attachment and retention features 124, 128 may include hook-and-loop, Velcro®, snap button, and eyelet configurations. Use of the curtain 56 in the canopy configuration with the support members 120 may be advantageous in increasing the size of the occupancy space 60 which the curtain 56 covers. Increasing the occupancy space 60 may be advantageous in helping to protect persons within the occupancy space 60 from rain (e.g., in waterproof examples of the curtain 56) from sun and to provide shade, as well as illuminate a larger area due to the phosphorescent photoluminescent material 18 and photoluminescent structure 10 positioned on the curtain 56.

Figure 6:
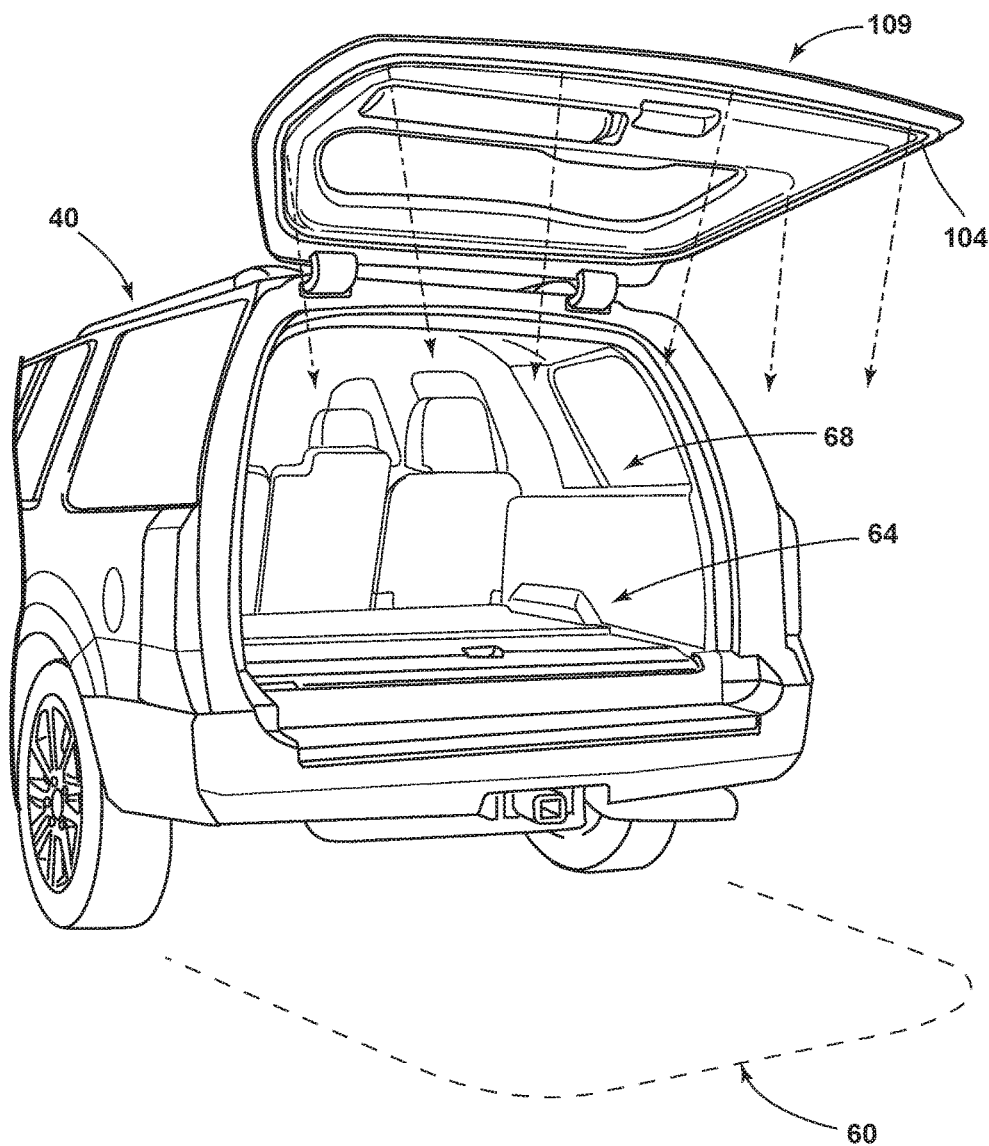
FIG. 6 is a rear perspective view of a vehicle with the lift gate open, according to another example.

Referring now to FIGS. 5 and 6, the light source 104 positioned on the cargo surface 100 of the interior trim panel 48 may be used to illuminate a ground space (e.g., the occupancy space 60) with (FIG. 5) or without (FIG. 6) the curtain 56. In such examples, when lift gate 44 is in the open position, the light source 104 may be activated to emit light in a generally downward direction towards the surface below the vehicle 40. The illumination provided by the light source 104 may provide task lighting, ambient lighting, functional lighting, or general area lighting. The light emitted from light source 104 may take a variety of colors and intensities or may be part of a light control routine (e.g., welcome, farewell, emergency, etc.). The light emitted from the light source 104 may wash over the cargo space 68 of the interior 64 of the vehicle 40 as well as below the lift gate 44 and vehicle rearward of the lift gate 44.

Figure 7B:
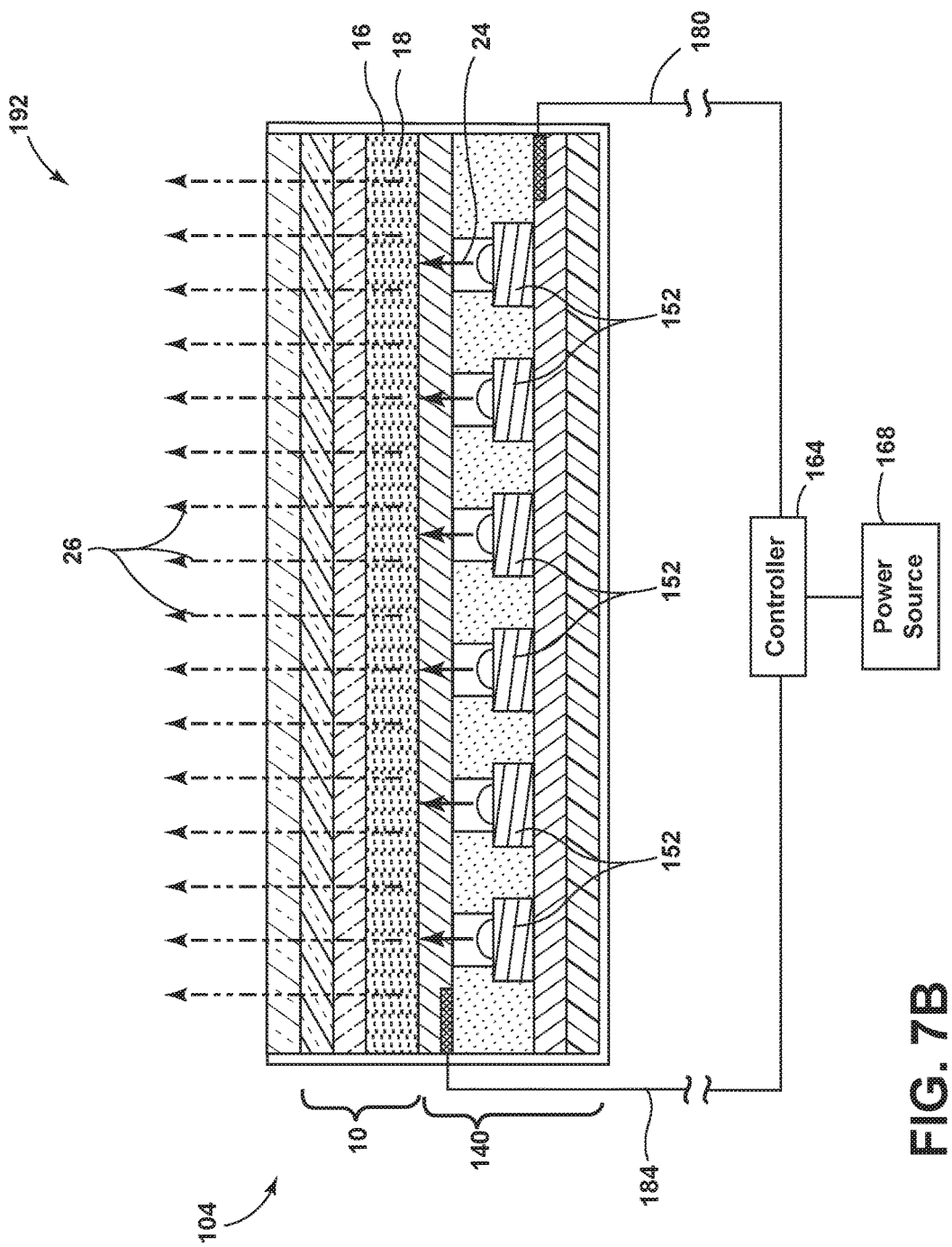
FIG. 7B is an enhanced view taken at section VIIB of FIG. 3 illustrating a light source according to one embodiment.

Referring now to FIGS. 7A-7E, a cross-sectional view of the light source 104 capable of use with the photoluminescent structure 10 is shown according to one example. As illustrated in FIG. 7A, the light source 104 may have a stacked arrangement that includes a light-producing assembly 140 and the photoluminescent structure 10. The light-producing assembly 140 may correspond to a thin-film or printed light emitting diode (LED) assembly and includes a substrate 144 as its lowermost layer. The substrate 144 may include a polycarbonate, poly-methyl methacrylate (PMMA), or polyethylene terephthalate (PET) material on the order of 0.005 to 0.060 inches thick. In an alternative example, the substrate 144 may correspond to the interior trim panel 48.

The light-producing assembly 140 includes a positive electrode 148 arranged over the substrate 144. The positive electrode 148 includes a conductive epoxy such as, but not limited to, a silver-containing or copper-containing epoxy. The positive electrode 148 is electrically connected to at least a portion of a plurality of LED sources 152 arranged within a semiconductor ink 156 and applied over the positive electrode 148. Likewise, a negative electrode 160 is also electrically connected to at least a portion of the LED sources 152. The negative electrode 160 is arranged over the semiconductor ink 156 and includes a transparent or translucent conductive material such as, but not limited to, indium-tin-oxide. Additionally, each of the positive and negative electrodes 148, 160 is electrically connected to a controller 164 and a power source 168 via a corresponding bus bar 172, 176 and conductive leads 180, 184. The bus bars 172, 176 may be printed along opposite edges of the positive and negative electrodes 148, 160 and the points of connection between the bus bars 172, 176 and the conductive leads 180, 184 may be at opposite corners of each bus bar 172, 176 to promote uniform current distribution along the bus bars 172, 176. It should be appreciated that in alternate embodiments, the orientation of components within the light-producing assembly 140 may be altered without departing from the concepts of the present disclosure. For example, the negative electrode 160 may be disposed below the semiconductor ink 156 and the positive electrode 148 may be arranged over the aforementioned semiconductor ink 156. Likewise, additional components, such as the bus bars 172, 176 may also be placed in any orientation such that the light-producing assembly 140 may emit converted light 26 or the excitation emission 24 towards a desired location.

The LED sources 152 may be dispersed in a random or controlled fashion within the semiconductor ink 156 and may be configured to emit focused or non-focused light toward the photoluminescent structure 10. The LED sources 152 may correspond to micro-LEDs of gallium nitride elements on the order of about 5 to about 400 microns in size and the semiconductor ink 156 may include various binders and dielectric material including, but not limited to, one or more of gallium, indium, silicon carbide, phosphorous, and/or translucent polymeric binders.

The semiconductor ink 156 can be applied through various printing processes, including ink jet and silk screen processes to selected portion(s) of the positive electrode 148. More specifically, it is envisioned that the LED sources 152 are dispersed within the semiconductor ink 156, and shaped and sized such that a substantial quantity of the LED sources 152 (e.g., over 50%) align with the positive and negative electrodes 148, 160 during deposition of the semiconductor ink 156. The portion of the LED sources 152 that ultimately are electrically connected to the positive and negative electrodes 148, 160 may be illuminated by a combination of the bus bars 172, 176, controller 164, power source 168, and conductive leads 180, 184. Additional information regarding the construction of light-producing assemblies is disclosed in U.S. Pat. No. 9,299,887 to Lowenthal et al. entitled "ULTRA-THIN PRINTED LED LAYER REMOVED FROM SUBSTRATE," the entire disclosure of which is incorporated herein by reference.

Referring still to FIG. 7A, the photoluminescent structure 10 is arranged over the negative electrode 160 as a coating, layer, film or other suitable deposition. With respect to the presently illustrated example, the photoluminescent structure 10 may be arranged as a multi-layered structure including the energy conversion layer 16, the optional stability layer 20, and the optional protective layer 22, as described above.

In some examples, a decorative layer 188 may be positioned on the photoluminescent structure 10. The decorative layer 188 may include a polymeric material or any other suitable material and is configured to control or modify an appearance of the light source 104. For example, the decorative layer 188 may be configured to confer a metallic appearance to the light source 188. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. In other embodiments, the decorative layer 126 may be tinted any color to complement the interior trim panel 48.

In any event, the decorative layer 188 may be at least partially light transmissible such that the converted light 26 may pass through it.

Referring to FIG. 7B, an energy conversion process 192 for producing single color luminescence is illustrated according to one embodiment. For purposes of illustration, the energy conversion process 192 is described below using the light source 104 depicted in FIG. 7A. In this embodiment, the energy conversion layer 16 of the photoluminescent structure 10 includes a single photoluminescent material 18, which is configured to convert the excitation light 24 received from LED sources 152 into an converted light 26 having a wavelength different than that associated with the excitation light 24. More specifically, the photoluminescent material 18 is formulated to have an absorption spectrum that includes the emission wavelength of the excitation light 24 supplied from the LED sources 152. The photoluminescent material 18 is also formulated to have a Stokes shift resulting in the visible converted light 26 having an emission spectrum expressed in a desired color, which may vary per lighting application. The visible converted light 26 is outputted from the light source 104, thereby causing the light source 104 to illuminate in the desired color. The illumination provided by the light source 104 may offer a unique, substantially uniform, and/or attractive viewing experience to the interior 64 or cargo space 68 (FIG. 2) that may be difficult to duplicate through non-photoluminescent means.

Figure 7C:
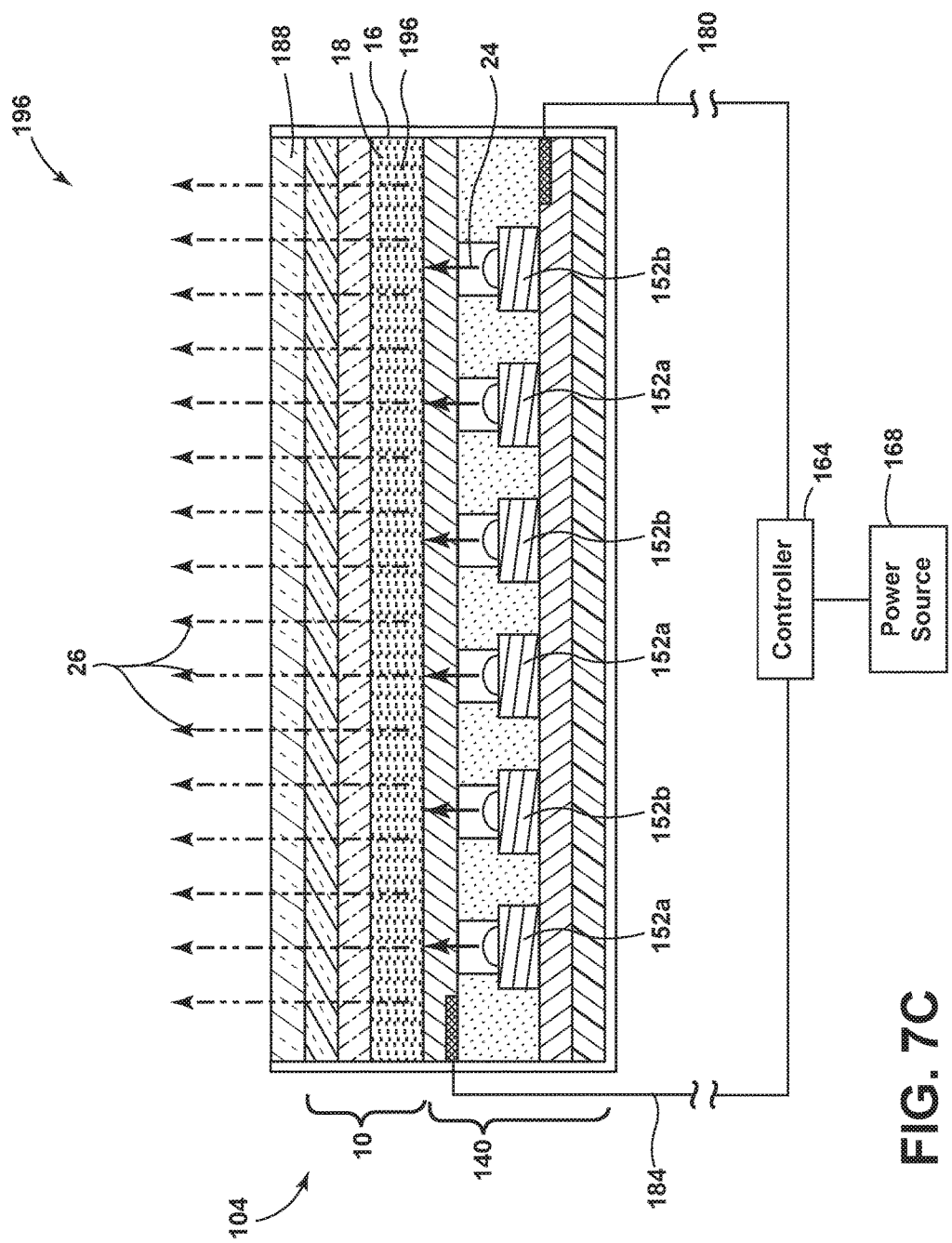
FIG. 7C is an enhanced view taken at section VIIC of FIG. 3 illustrating a light source according to one embodiment.

Referring to FIG. 7C, a second energy conversion process 196 for generating multiple colors of light is illustrated according to one embodiment. For consistency, the second energy conversion process 196 is also described below using the light source 104 depicted in FIG. 7A. In this embodiment, the energy conversion layer 16 includes the first and second photoluminescent materials 18, 196 that are interspersed within the energy conversion layer 16. Alternatively, the photoluminescent materials 18, 196 may be isolated from each other if desired. Also, it should be appreciated that the energy conversion layer 16 may include more than two different photoluminescent materials 18 and 196, in which case, the teachings provided below similarly apply. In one embodiment, the second energy conversion process 196 occurs by way of down conversion using blue, violet, and/or UV light as the source of excitation.

With respect to the presently illustrated example, the excitation of photoluminescent materials 18, 196 is mutually exclusive. That is, photoluminescent materials 18, 196 are formulated to have non-overlapping absorption spectrums and Stokes shifts that yield different emission spectrums. Also, in formulating the photoluminescent materials 18, 196, care should be taken in choosing the associated Stokes shifts such that the converted light 26 emitted from one of the photoluminescent materials 18, 196, does not excite the other, unless so desired. According to various examples, a first portion of the LED sources 152, exemplarily shown as LED sources 152a, is configured to emit an excitation light 24 having an emission wavelength that only excites the photoluminescent material 18 and results in the excitation light 24 being converted into a converted light 26 of a first color (e.g., white). Likewise, a second portion of the LED sources 152, exemplarily shown as LED sources 152b, is configured to emit an excitation light 24 having an emission wavelength that only excites second photoluminescent material 196 and results in the excitation light 24 being converted into a converted light 26 of a second color (e.g., red). Preferably, the first and second colors are visually distinguishable from one another. In this manner, LED sources 152a and 152b may be selectively activated using the controller 164 to cause the photoluminescent structure 10 to luminesce in a variety of colors. For example, the controller 164 may activate only LED sources 152a to exclusively excite the photoluminescent material 18, resulting in the decorative layer 188 illuminating in the first color. Alternatively, the controller 164 may activate only LED sources 152b to exclusively excite the second photoluminescent material 196, resulting in the decorative layer 188 illuminating in the second color.

Alternatively still, the controller 164 may activate LED sources 152a and 152b in concert, which causes both of the photoluminescent materials 18, 196 to become excited, resulting in the decorative layer 188 illuminating in a third color, which is a color mixture of the first and second color (e.g., pinkish). The intensities of the excitation light 24 emitted from the LED sources 152 may also be proportionally varied to one another such that additional colors may be obtained. For energy conversion layers 16 containing more than two distinct photoluminescent materials 18, a greater diversity of colors may be achieved. Contemplated colors include red, green, blue, and combinations thereof, including white, all of which may be achieved by selecting the appropriate photoluminescent materials 18 and correctly manipulating the corresponding LED sources 152.

Figure 7D:
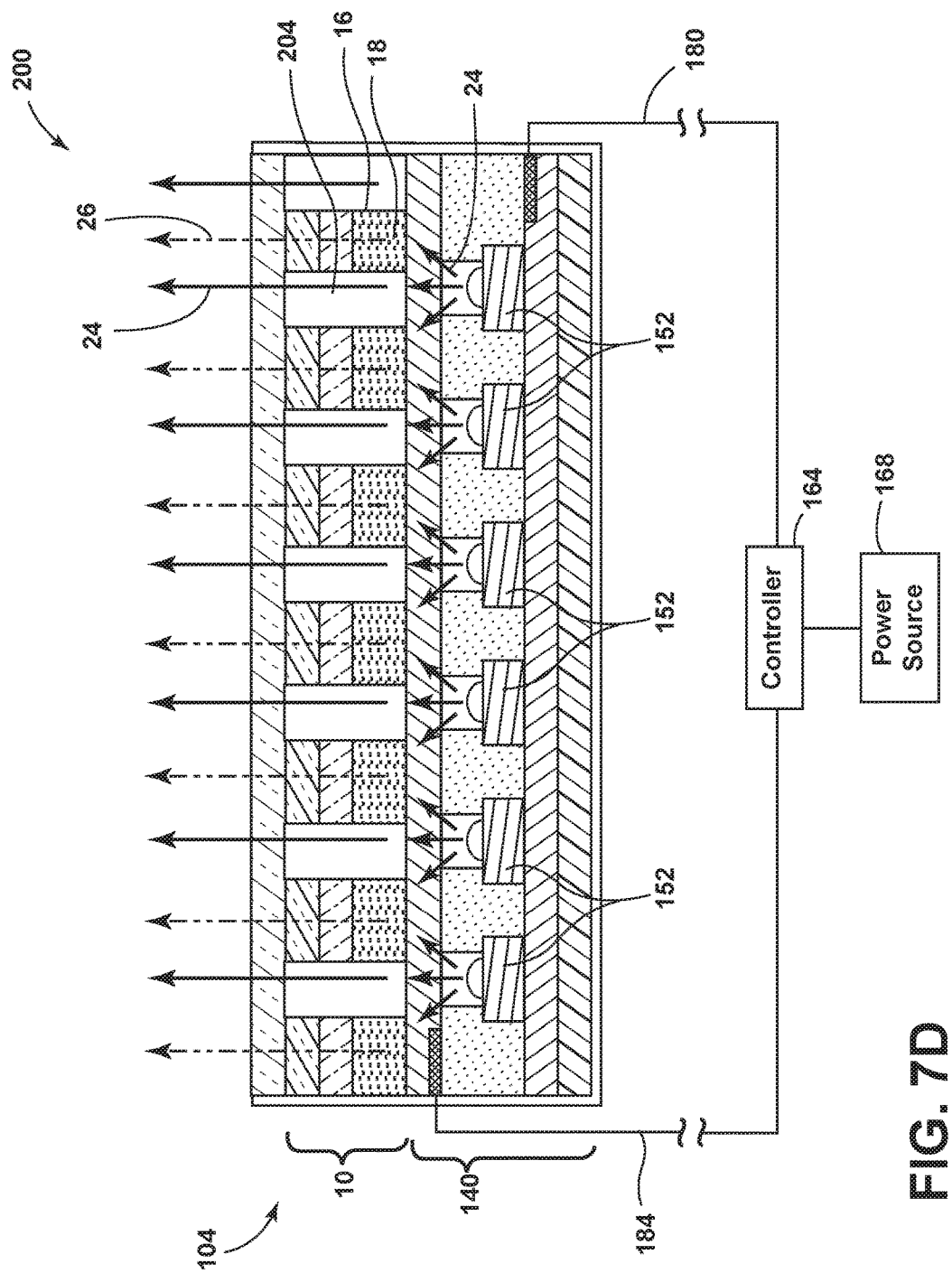
FIG. 7D is an enhanced view taken at section VIID of FIG. 3 illustrating a light source according to one embodiment.

Referring to FIG. 7D, a third energy conversion process 200 includes a light-producing assembly 140, such as the one described in reference to FIG. 7A, and a photoluminescent structure 10 disposed thereon is illustrated, according to an alternate embodiment. The photoluminescent material 10 is configured to convert excitation light 24 received from LED sources 110 into a converted light 26 having a wavelength different than that associated with the excitation light 24. More specifically, the photoluminescent structure 10 is formulated to have an absorption spectrum that includes the emission wavelength of the excitation light 24 supplied from the LED sources 152. The photoluminescent material 18 is also formulated to have a Stokes shift resulting in the converted light 26 having an emission spectrum expressed in a desired color, which may vary per lighting application.

The photoluminescent structure 10 may be applied to a portion of the light-producing assembly 140, for example, in a stripped manner. Between the photoluminescent structures 10 may be light transmissive portions 204 that allow excitation light 24 emitted from the LED sources 152 to pass therethrough at the first wavelength. The light transmissive portions 204 may be an open space, or may be a transparent or translucent material. The excitation light 24 emitted through the light transmissive portions 204 may be directed from the light-producing assembly 140 towards an additional photoluminescent structure disposed proximate to the light-producing assembly 140 (e.g., the photoluminescent structure 10 of the curtain 56). The additional photoluminescent structure may be configured to luminesce in response to the excitation light 24 that is directed through the light transmissive portions 204.

Figure 7E:
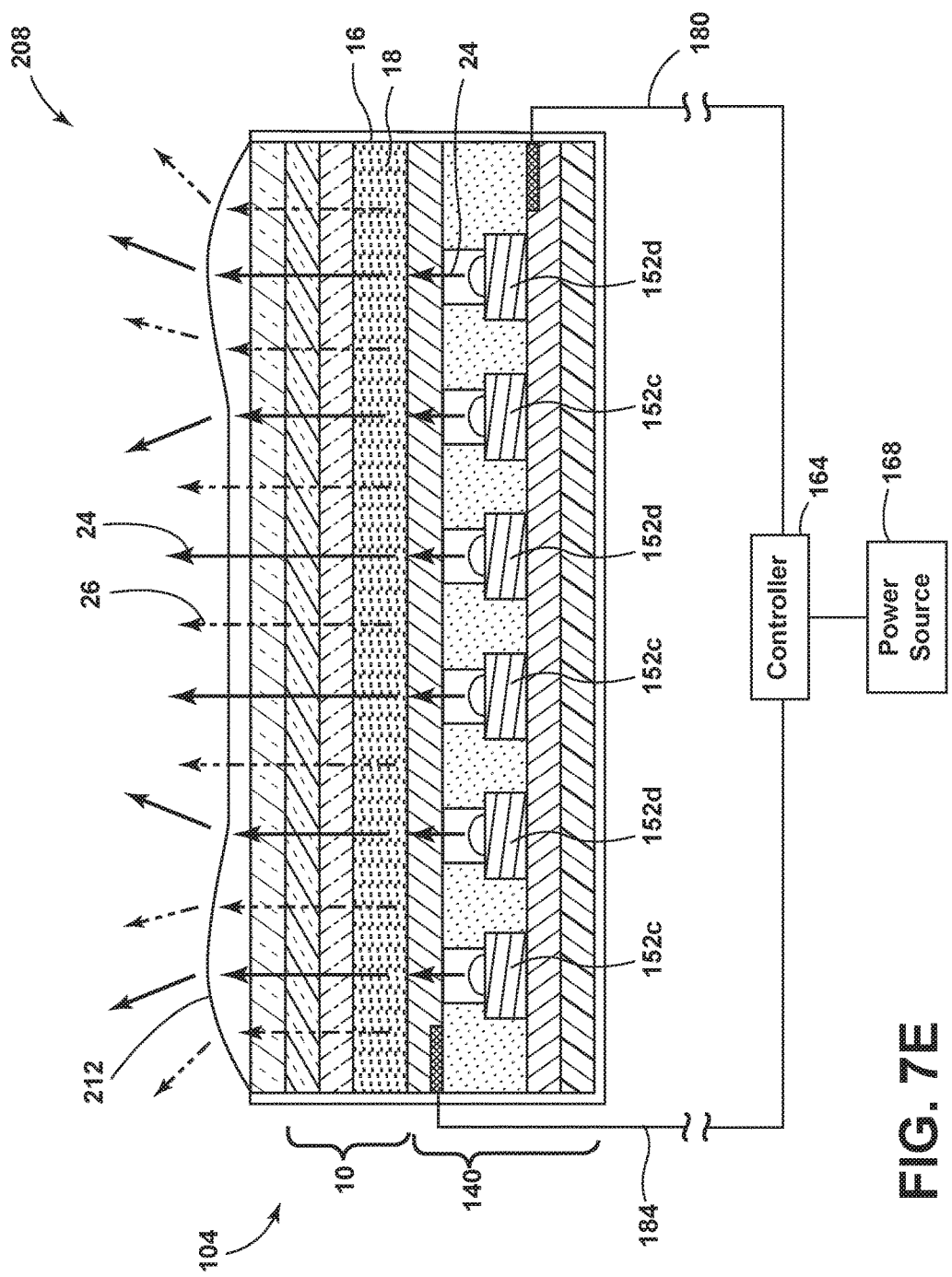
FIG. 7E is an enhanced view taken at section VIIE of FIG. 3 illustrating a light source according to one embodiment.

Referring to FIG. 7E, a fourth energy conversion process 208 for generating multiple colors of light utilizing the light-producing assembly 140, such as the one described in reference to FIG. 7A, and the photoluminescent structure 10 disposed thereon is illustrated. The excitation of photoluminescent material 18 is formulated such that a portion of excitation light 24 emitted from the LED sources 152 passes through the photoluminescent structure 10 at the first wavelength (i.e., the excitation light 24 emitted from the light source 104 is not converted by the photoluminescent structure 10). The intensity of the outputted light (i.e., the combination of the excitation light 24 and converted light 26) may be modified by pulse-width modulation or current control to vary the amount of excitation light 24 emitted from the LED sources 152 that passes through the photoluminescent structure 10 without converting to a second wavelength of converted light 26. For example, if the light source 104 is configured to emit excitation light 24 at a low level, substantially all of the excitation light 24 may be converted to converted light 26. In this configuration, a color of converted light 26 corresponding to the photoluminescent structure 10 may be emitted from the light-producing assembly 140. If the light source 104 is configured to emit excitation light 24 at a high level, only a portion of the first wavelength may be converted by the photoluminescent structure 10. In this configuration, a first portion of the outputted light may be converted by the photoluminescent structure 10 and a second portion of the outputted light may be emitted from the light-producing assembly 140 at the first wavelength towards additional photoluminescent structures disposed proximately to the light source 104 (e.g., on the curtain 56). The additional photoluminescent structures may luminesce in response to the excitation light 24 emitted from the light source 104.

According to one exemplary embodiment, a first portion of the LED sources 152, exemplarily shown as LED sources 152c is configured to emit an excitation light 24 having a wavelength that excites the photoluminescent material 18 within the photoluminescent structure 10 and results in the excitation light 24 being converted into a converted light 26 of a first color (e.g., white). Likewise, a second portion of the LED sources 152, exemplarily shown as LED sources 152d, is configured to emit an excitation light 24 having a wavelength that passes through the photoluminescent structure 10 and excites additional photoluminescent structures disposed proximately to the light source 104 thereby illuminating in a second color. The first and second colors may be visually distinguishable from one another. In this manner, LED sources 152c and 152d may be selectively activated using the controller 164 to cause the light source 104 to luminesce in a variety of colors.

The light-producing assembly 140 may also include optics 212 that are configured to direct light the excitation light 24 emitted from the LED sources 152c, 152d and the converted light 26 emitted from the photoluminescent structure 10 towards pre-defined locations. For example, the excitation light 24 from the LED sources 152c, 152d and the photoluminescent structure 10 may be directed and/or focused towards specific areas of the curtain 56 (FIG. 2A), the ground beneath the vehicle 40 and/or the indicia.

It will be understood that the foregoing description of the light-producing assembly 140 may be applied to form a single continuous light source 104 and/or a plurality of individual light sources 104 (e.g., or LED sources 152). In examples where there are a plurality of light sources 104, some or all of the light sources 104 may be independently electrically connected (e.g., through a conductive ink or wires). In independently electrically connected examples of the light sources 104, each of the light sources 104 may be independently addressable, which may allow the controller 164 to create static and dynamic patterns of light on the curtain 56 by independently illuminating certain light sources 104 and not others. Further, some, or all, of the light sources 104 may be covered by a single portion of the photoluminescent structure 10. Formation of the plurality of light sources 104 using a plurality of light-producing assemblies 140 may be accomplished in a similar manner to that as described in connection with the lightplate of U.S. Patent Application Publication No. 2015/0136573 filed on Oct. 6, 2014, the disclosure of which is hereby incorporated herein in its entirety. Further, the light producing assembly 140 and/or light source(s) 104 may be formed, and obtain the same or similar advantages as described above, through the placement and securement of a plurality of light sources on a flexible substrate as described in U.S. Patent Application Publication No. 2016/0276205 filed on Nov. 12, 2015, which is hereby incorporated herein in its entirety.

Figure 8:
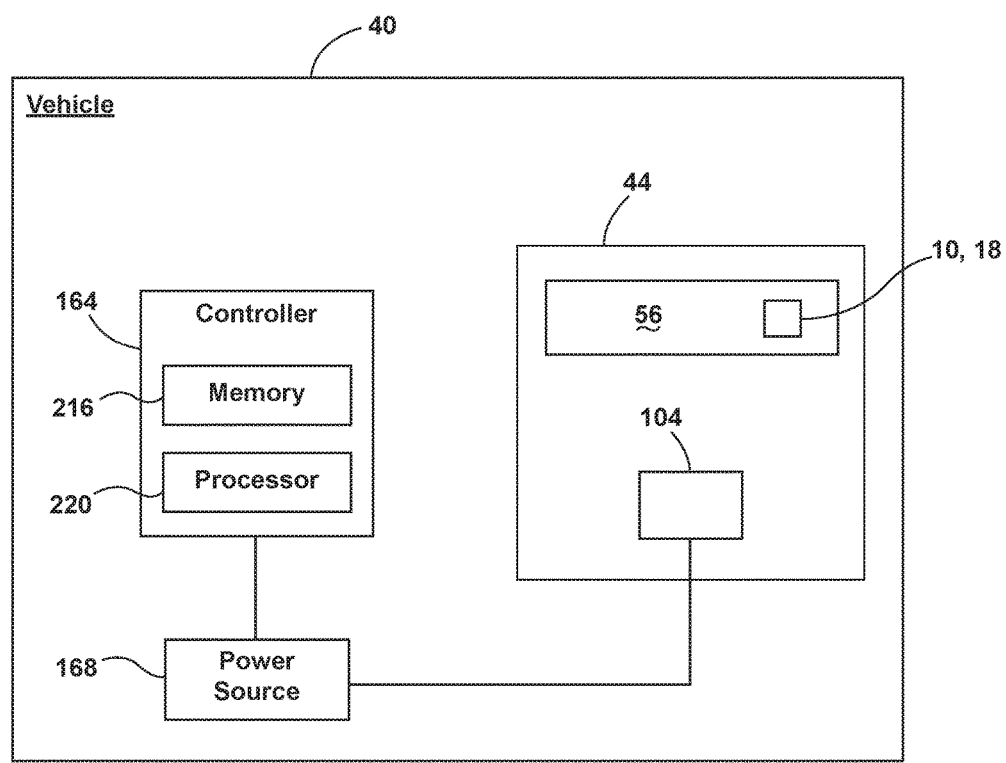
FIG. 8 is a box diagram of the vehicle and controls for the illuminated lift gate and curtain, according to one embodiment.

Referring now to FIG. 8, depicted is a box diagram of the vehicle 40 in which the curtain 56 is implemented. The vehicle 40 includes the controller 164. The controller 164 may include a memory 216 having instructions (e.g., routines) contained therein that are executed by a processor 220 of the controller 164. The controller 164 may provide electrical power to the light source 104 via the power source 168 located onboard the vehicle 40. The memory 216 may include a variety of lighting routines configured to illuminate the light source 104 and/or charge the curtain 56. According to one routine, the light source 104 is activated to emit the excitation emission 24 and/or visible light to charge the curtain 56 and illuminate the occupancy space 60. In another routine, the light source 104 may be configured to emit colored light (e.g., corresponding to team colors for using the curtain 56 during tailgating). In another routine, the light source 104 may be activated to emit light independently of the presence of the curtain 56 and to project the light in a downward manner toward the ground. In yet another routine, the light source 104 may emit light to provide task or ambient lighting to the cargo space 64.

Use of the present disclosure may offer several advantages. First, use of the curtain 56 allows for the definition of the occupancy space 60 behind the vehicle 40. In examples where the curtain 56 hangs downwardly from the lift gate 44, the occupancy space 60 may provide privacy to a user of the vehicle 40. In examples where the curtain 56 is outstretched to the support members 120 to define a greater-sized occupancy space 60, the curtain 56 may protect multiple people from environmental elements as explained above. For example, such a configuration of the curtain 56 may be advantageous while tailgating or working proximate the vehicle 40. Second, use of the photoluminescent structure 10 and/or photoluminescent material 18 on and/or in the curtain 56 may allow for the curtain 56 to illuminate the occupancy space 60 (i.e., in both configurations of the curtain 56). Third, use of the track assembly 52 allows for the easy positioning of the curtain in a variety of positions around the lift gate 44. Fourth, positioning the light source 104 on the interior trim panel 48 of the lift gate 44 allows the light source 104 to provide sconce lighting to the interior 64 of the vehicle 40 as well as to ground surfaces behind the vehicle 40.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below, are incorporated into and constitute part of this Detailed Description.

What is claimed is:

1. A vehicle, comprising:
   a lift gate operable between open and closed positions and comprising:
      an interior trim panel; and
      a track assembly positioned on a perimeter of the interior trim panel; and
   a curtain coupled to the track assembly and configured to hang from the lift gate in the open position.

2. The vehicle of claim 1, wherein the curtain comprises a photoluminescent structure.

3. The vehicle of claim 2, wherein the photoluminescent structure comprises a phosphorescent material.

4. The vehicle of claim 1, further comprising:
a storage bin coupled to the interior trim panel and configured to store the curtain when the lift gate is in the closed position.

5. The vehicle of claim 1, wherein the curtain is substantially opaque.

6. The vehicle of claim 5, wherein the curtain defines an occupancy space behind the vehicle and under the lift gate in the open position.

7. The vehicle of claim 1, further comprising:
a light source configured to emit light onto the curtain.

8. The vehicle of claim 7, wherein the light source is positioned on an interior trim panel of the lift gate.

9. The vehicle of claim 1, further comprising:
a support member coupled to the curtain, wherein the support member is positioned vehicle rearward of the vehicle such that the curtain extends in a vehicle rearward direction from the lift gate.

10. A vehicle, comprising:
a lift gate operable between open and closed positions;
a track assembly positioned proximate a perimeter of the lift gate; and
a curtain coupled to the track assembly and configured to hang from the lift gate in the open position, wherein the curtain defines occupancy space behind the vehicle and under the lift gate in the open position.

11. The vehicle of claim 10, wherein the curtain comprises a first portion and a second portion which are independently movable along the track assembly.

12. The vehicle of claim 10, wherein the curtain is substantially waterproof.

13. The vehicle of claim 10, wherein the curtain comprises a phosphorescent material.

14. The vehicle of claim 10, further comprising:
a light source positioned on the lift gate, wherein the light source emits light into an interior of the vehicle when the lift gate is in the closed position.

15. A vehicle, comprising:
a lift gate operable between open and closed positions;
a track assembly positioned proximate a perimeter of the lift gate; and
a curtain coupled to the track assembly and configured to hang from the lift gate in the open position, wherein the curtain comprises a photoluminescent structure.

16. The vehicle of claim 15, wherein the curtain is substantially opaque.

17. The vehicle of claim 16, further comprising:
a light source positioned proximate the curtain and configured to charge the photoluminescent structure.

18. The vehicle of claim 17, wherein the light source emits an excitation emission to charge the photoluminescent structure.

19. The vehicle of claim 18, wherein the curtain is substantially opaque.

20. The vehicle of claim 19, wherein the curtain defines an occupancy space behind the vehicle and under the lift gate in the open position.

* * * * *